United States Patent
Kim et al.

(10) Patent No.: US 12,164,338 B2
(45) Date of Patent: Dec. 10, 2024

(54) DISPLAY DEVICE

(71) Applicant: LG ELECTRONICS INC., Seoul (KR)

(72) Inventors: Chulki Kim, Seoul (KR); Kwangho Choi, Seoul (KR); Seokhun Na, Seoul (KR); Hyongil Kil, Seoul (KR); Minook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 17/874,980

(22) Filed: Jul. 27, 2022

(65) Prior Publication Data

US 2023/0030896 A1    Feb. 2, 2023

(30) Foreign Application Priority Data

Jul. 29, 2021    (KR) .................. 10-2021-0100027

(51) Int. Cl.
*G06F 1/16*    (2006.01)

(52) U.S. Cl.
CPC .......... *G06F 1/1652* (2013.01); *G06F 1/1624* (2013.01); *G06F 1/1656* (2013.01)

(58) Field of Classification Search
CPC .... G06F 1/1652; G06F 1/1624; G06F 1/1656; G06F 2200/1612; G06F 1/1601; G09F 9/301
See application file for complete search history.

(56) References Cited

U.S. PATENT DOCUMENTS

| | | | |
|---|---|---|---|
| 9,123,290 B1* | 9/2015 | Cho | G06F 1/1652 |
| 9,413,284 B2* | 8/2016 | Cho | H10K 50/84 |
| 9,510,440 B2* | 11/2016 | Nam | G06F 1/1652 |
| 9,727,080 B2* | 8/2017 | Jung | G06F 1/20 |
| 9,829,069 B2* | 11/2017 | Park | G09F 9/301 |
| 9,839,145 B2* | 12/2017 | Ryu | H10K 59/87 |
| 9,983,428 B2* | 5/2018 | Im | G02F 1/133308 |
| 10,484,642 B2* | 11/2019 | Park | G09G 3/3216 |
| 11,226,654 B2* | 1/2022 | De Saulles | H10K 77/111 |
| 11,749,138 B2* | 9/2023 | Park | G09F 9/301 |
| | | | 361/679.01 |

(Continued)

FOREIGN PATENT DOCUMENTS

| | | |
|---|---|---|
| JP | 2006023676 | 1/2006 |
| KR | 1020150015276 | 2/2015 |

(Continued)

OTHER PUBLICATIONS

PCT International Application No. PCT/KR2021/011936, Search Report dated Apr. 27, 2022, 3 pages.

*Primary Examiner* — Rockshana D Chowdhury
(74) *Attorney, Agent, or Firm* — LEE, HONG, DEGERMAN, KANG & WAIMEY

(57) ABSTRACT

Disclosed is a display device. The display device may include: a flexible display panel; a flexible plate at a rear of the display panel, to which the display panel is coupled, and has one side and the other side facing the one side; a rear frame coupled to a rear of the plate; a driving unit which is coupled to the rear frame, and provides a driving force for moving in a direction from the one side to the other side; and an arm which is elongated to have one end that is connected to the driving unit and the other end that is coupled to a rear surface of the plate.

5 Claims, 17 Drawing Sheets

(56) References Cited

U.S. PATENT DOCUMENTS

| | | | |
|---|---|---|---|
| 2001/0052892 A1 | 12/2001 | Oda | |
| 2014/0198465 A1* | 7/2014 | Park | G09F 9/00 |
| | | | 361/749 |
| 2015/0043136 A1* | 2/2015 | Kim | G02F 1/133305 |
| | | | 361/679.01 |
| 2016/0127674 A1* | 5/2016 | Kim | H04N 21/42204 |
| | | | 348/739 |
| 2017/0188470 A1* | 6/2017 | Cho | G09F 9/301 |
| 2017/0193863 A1* | 7/2017 | Cho | G06F 1/16 |
| 2017/0289491 A1* | 10/2017 | Park | G09F 9/301 |
| 2018/0033344 A1* | 2/2018 | Chen | G06F 1/1652 |
| 2018/0220537 A1* | 8/2018 | Heo | F16M 11/045 |
| 2020/0323087 A1* | 10/2020 | Hwang | H05K 5/0247 |
| 2021/0181797 A1* | 6/2021 | Wolff | G06F 1/1656 |

FOREIGN PATENT DOCUMENTS

| | | |
|---|---|---|
| KR | 1020160141009 | 12/2016 |
| KR | 101757226 | 7/2017 |
| KR | 1020190092966 | 8/2019 |

* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2021-0100027, filed on Jul. 29, 2021, the contents of which are hereby incorporated by reference herein in its entirety.

BACKGROUND OF THE INVENTION

1. Field of the Invention

The present disclosure relates to a display device. More particularly, the present disclosure relates to a display device capable of changing the curvature of a display panel.

2. Description of the Related Art

As the information society develops, the demand for display devices is also increasing in various forms. In response to this, various display devices such as Liquid Crystal Display Device (LCD), Electro luminescent Display (ELD), Vacuum Fluorescent Display (VFD), and Organic Light Emitting Diode (OLED) have been researched and used in recent years.

Among them, the OLED panel may display an image by depositing an organic material layer capable of emitting light by itself on a substrate on which a transparent electrode is formed. The OLED panel may have a thin thickness as well as flexible characteristics. A lot of research has been achieved on the structural characteristics of a display device having such an OLED panel.

SUMMARY OF THE INVENTION

The present disclosure has been made in view of the above problems, and provides a frame structure which can freely change the curvature of a display panel. The present disclosure further provides a mechanism which can freely change the curvature of a display.

In accordance with an aspect of the present disclosure, a display device may include: a flexible display panel; a flexible plate at a rear of the display panel, to which the display panel is coupled, and has one side and the other side facing the one side; a rear frame coupled to a rear of the plate; a driving unit which is coupled to the rear frame, and provides a driving force for moving in a direction from the one side to the other side; and an arm which is elongated to have one end that is connected to the driving unit and the other end that is coupled to a rear surface of the plate.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
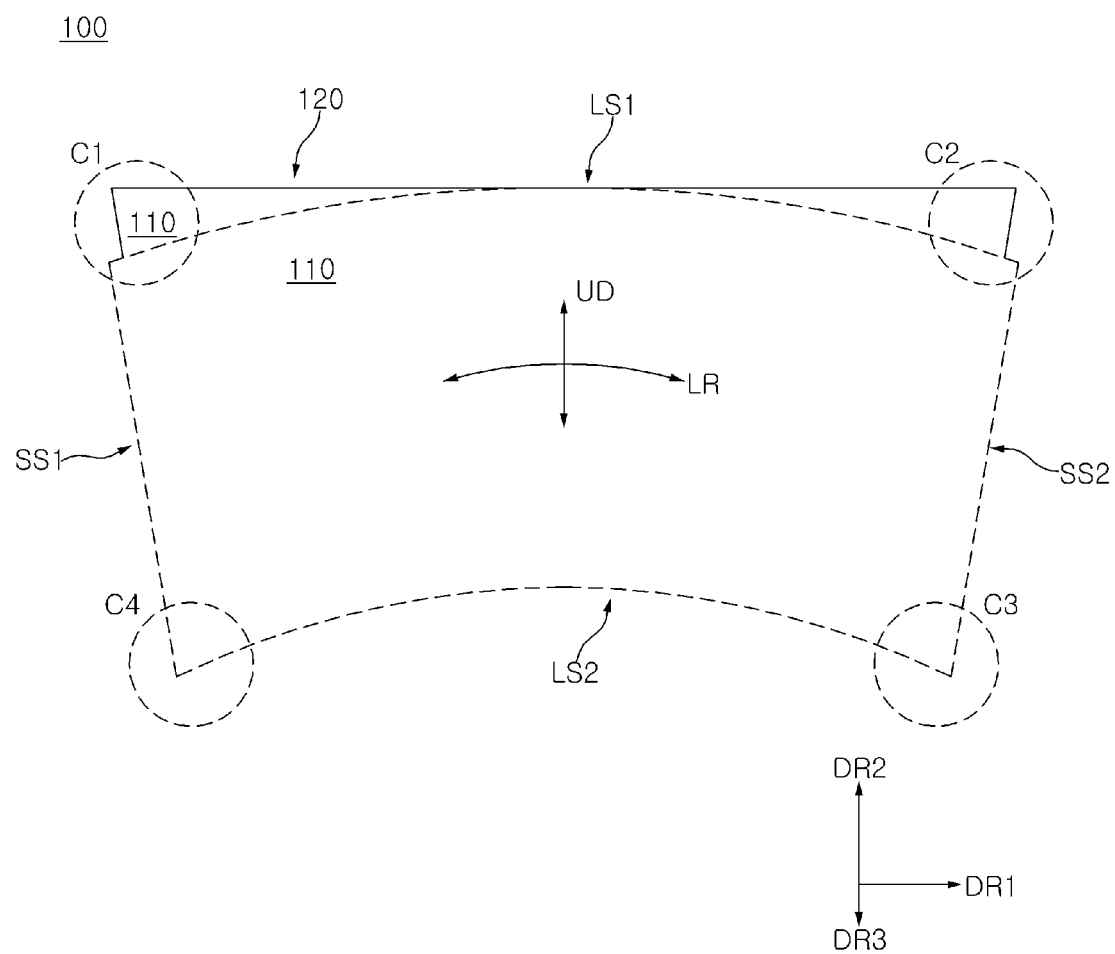
FIGS. 1 to 17 are diagrams illustrating examples of a display device according to embodiments of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component.

These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

Hereinafter, an Organic Light Emitting Diode (OLED) will be described as an example for a display panel, but the display panel applicable to the present disclosure is not limited to the OLED panel.

In addition, hereinafter, a display device may include a first long side LS1, a second long side LS2 opposite to the first long side LS1, a first short side SS1 adjacent to one end of the first long side LS1 and the second long side LS2, and a second short side SS2 opposite to the first short side SS1.

Here, the first short side area SS1 may be referred to as a first side area, the second short side area SS2 may be referred to as a second side area opposite to the first side area, the first long side area LS1 may be referred to as a third side area which is adjacent to the first side area and the second side area, and positioned between the first side area and the second side area, and the second long side area LS2 may be referred to as a fourth side area which is adjacent to the first side area and the second side area, positioned between the first side area and the second side area, and opposite to the third side area.

In addition, for convenience of explanation, it is illustrated and described that the lengths of the first and second long sides LS1 and LS2 are longer than the lengths of the first and second short sides SS1 and SS2. However, it may be possible that the lengths of the first and second long sides LS1 and LS2 are approximately equal to the lengths of the first and second short sides SS1 and SS2.

In addition, hereinafter, a first direction DR1 may be a direction parallel to the long side LS1, LS2 of a display panel 100, and a second direction DR2 may be a direction parallel to the short side SS1, SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side on which the display device displays an image may be referred to as a forward direction or a front surface. When the display device displays an image, the side from which the image cannot be observed may be referred to as a rearward direction, or a rear surface. When the display is viewed from the forward direction or the front surface, the side of the first long side LS1 may be referred to as an upper side or an upper surface. Similarly, the side of the second long side LS2 may be referred to as a lower side or a lower surface. Similarly, the side of the first short side SS1 may be referred to as a left side or a left surface, and the side of the second short side SS2 may be referred to as a right side or a right surface.

In addition, the first long side LS1, the second long side LS2, the first short side SS1, and the second short side SS2 may be referred to as an edge of the display device. In addition, a point where the first long side LS1, the second long side LS2, the first short side SS1, and the second short side SS2 meet each other may be referred to as a corner. For example, a point where the first long side LS1 and the first short side SS1 meet may be a first corner C1, a point where the first long side LS1 and the second short side SS2 meet may be a second corner C2, a point where the second short side SS2 and the second long side LS2 meet may be a third corner C3, and a point where the second long side LS2 and the first short side SS1 meet may be a fourth corner C4.

A direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Referring to FIG. 1, a plate 120 may be flexible. For example, the plate 120 may be a metal plate. The plate 120 may be referred to as a flexible plate 120, a frame 120, or a module cover 120. A display panel 110 may be positioned in a forward direction or in a front surface of the plate 120. The display panel 110 may be flexible. For example, the display panel 110 may be an OLED panel.

The display panel 110 is provided on the front surface of a display device 100 so that an image can be displayed. The display panel 110 may divide an image into a plurality of pixels and output an image by matching color, brightness, and saturation for each pixel. The display panel 110 may generate light corresponding to a color of red, green, or blue according to a control signal.

The display device 100 may have a variable curvature. In the display device 100, left and right sides of the display device 100 may move in a forward direction. For example, in a state where an image is viewed from the forward direction of the display device 100, the display device 100 may be curved concavely. In this case, the plate 120 may be bent with the same curvature as the display panel 110. Alternatively, the display panel 110 may be bent to correspond to the curvature of the plate 120.

Figure 2:
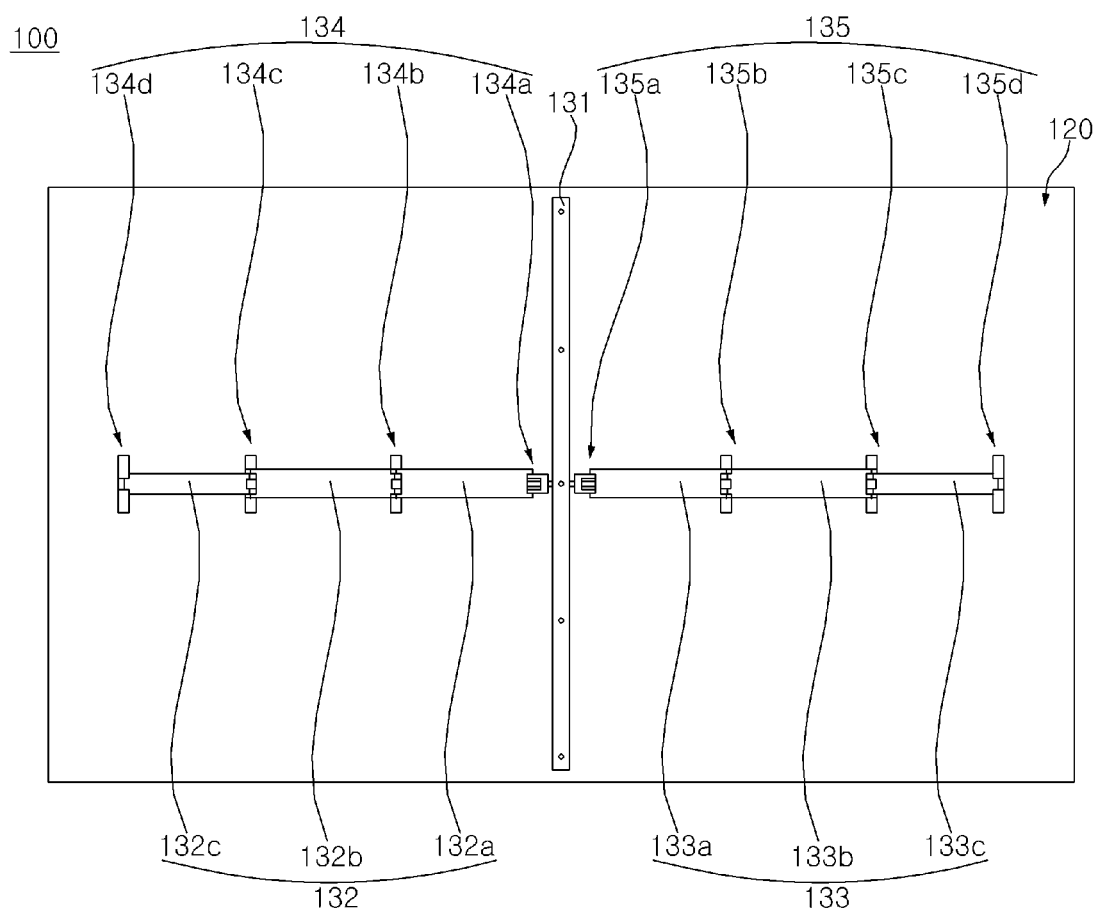
Figure 3:
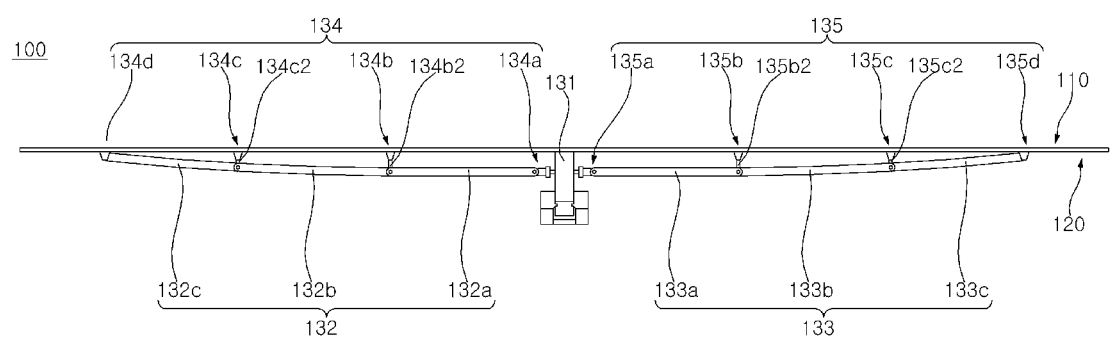

Referring to FIGS. 2 and 3, a rear frame 131 may be coupled in the rearward direction of the plate 120. The rear frame 131 may be elongated in an up-down direction and be fixed to the center of the rear surface of the plate 120. A link 132, 133, 134, 135 may be long coupled to the rear surface of the plate 120 in a direction intersecting with the rear frame 131. The link 132, 133, 134, 135 may include a plurality of arms 132 and 133 and a plurality of supporters 134 and 135.

The plurality of arms 132 and 133 may include a first arm 132a, 133a, a second arm 132b, 133b, and a third arm 132c, 133c. The plurality of arms 132 and 133 may include a plurality of right arms 132 and a plurality of left arms 133. Hereinafter, the plurality of right arms 132 will be mainly described, but the same description may be applied to the plurality of left arms 133. In addition, although the plurality of right supporters 134 will be mainly described, the same description may be applied to the plurality of left supporters 135.

The first arm 132a may be an elongated plate and may have rigidity. The first arm 132a may be disposed to be elongated in a direction intersecting with the length direction of the rear frame 131. The second arm 132b may be an elongated plate and may have rigidity. The width of the second arm 132b may be smaller than or substantially equal to the width of the first arm 132a. The third arm 132c may be an elongated plate and may have rigidity. The width of the third arm 132c may be smaller than the width of the second arm 132b.

The first arm 132a may be disposed to be elongated from the rear plate 131 toward the left side of the plate 120 in the left and right direction, the second arm 132b may be disposed from the first arm 132a toward the left side of the plate 120, and the third arm 132c may be elongated toward the left side of the plate 120 from the second arm 132b.

A first supporter 134a may be pivotally connected to one end of the first arm 132a, between the first arm 132a and the rear frame 131. The first supporter 134a may be referred to as a first connector 134a. A second supporter 134b may be pivotally connected to the other end of the first arm 132a and one end of the second arm 132b, between the first arm 132a and the second arm 132b. A third supporter 134c may be pivotally connected to the other end of the second arm 132b and one end of the third arm 132c, between the second arm 132b and the third arm 132c. A fourth supporter 134d may be pivotally connected to the other end of the third arm 132c.

A second connector 134b2 may have one end pivotally connected to the second supporter 134b and the other end pivotally connected to the first arm 132a and the second arm 132b. The second supporter 134b may be fixed to the rear surface of the plate 120. A third connector 134c2 may have one end pivotally connected to the third supporter 134c and the other end pivotally connected to the second arm 132b and the third arm 132c. The third supporter 134c may be fixed to the rear surface of the plate 120. The first supporter 134b and/or the third supporter 134c may be fixed to the rear surface of the plate 120.

Figure 4:
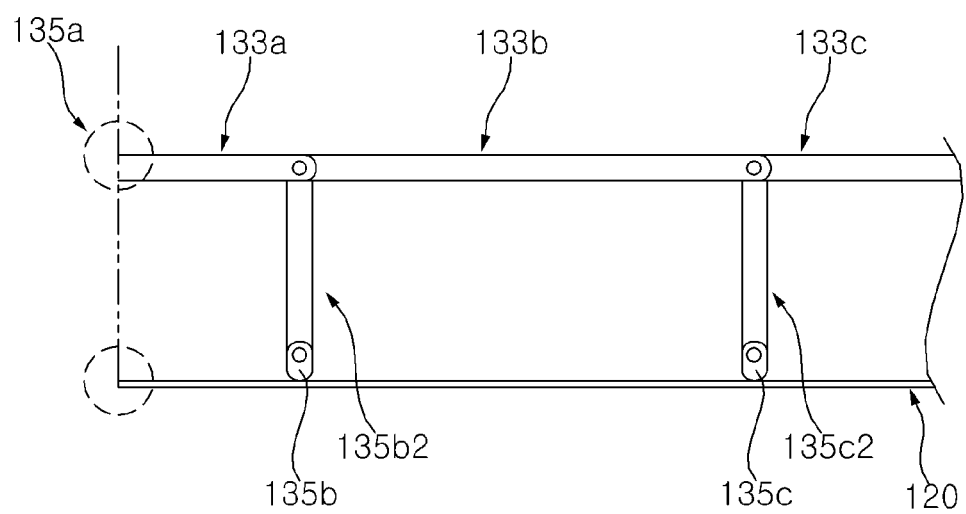
Figure 5:
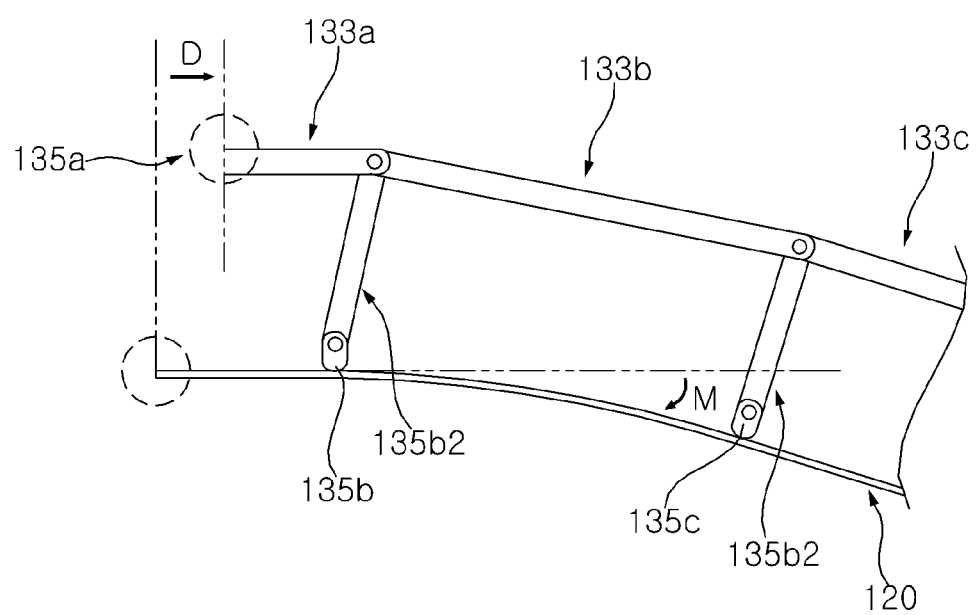

Referring to FIGS. 4 and 5, the second connector 135b2 may pivot on the second supporter 135b. The second connector 135b2 may pivot with respect to the first arm 133a and the second arm 133b. When a distal end of the first arm 133a moves away from the rear frame 131 (refer to FIG. 3), the second connector 135b2 may pivot with respect to the second supporter 135b, and the second arm 133b may move.

When a distal end of the second arm 133b moves away from the rear frame 131, the third connector 135c2 may pivot on the third supporter 135c. The third connector 135c2 may pivot with respect to the second arm 133b and the third arm 133c. When the distal end of the second arm 133b moves away from the rear frame 131, the third connector 135c2 may pivot with respect to the third supporter 135c, and the third arm 133c may move.

As the first arm 133a, the second arm 133b, and the third arm 133c pivot and move, the plate 120 may be curved. The length direction movement displacement D of the first arm 133a may provide a force M that is curved to the plate 120 by the pivoting and movement of the second arm 133b and the third arm 133c.

Figure 6:
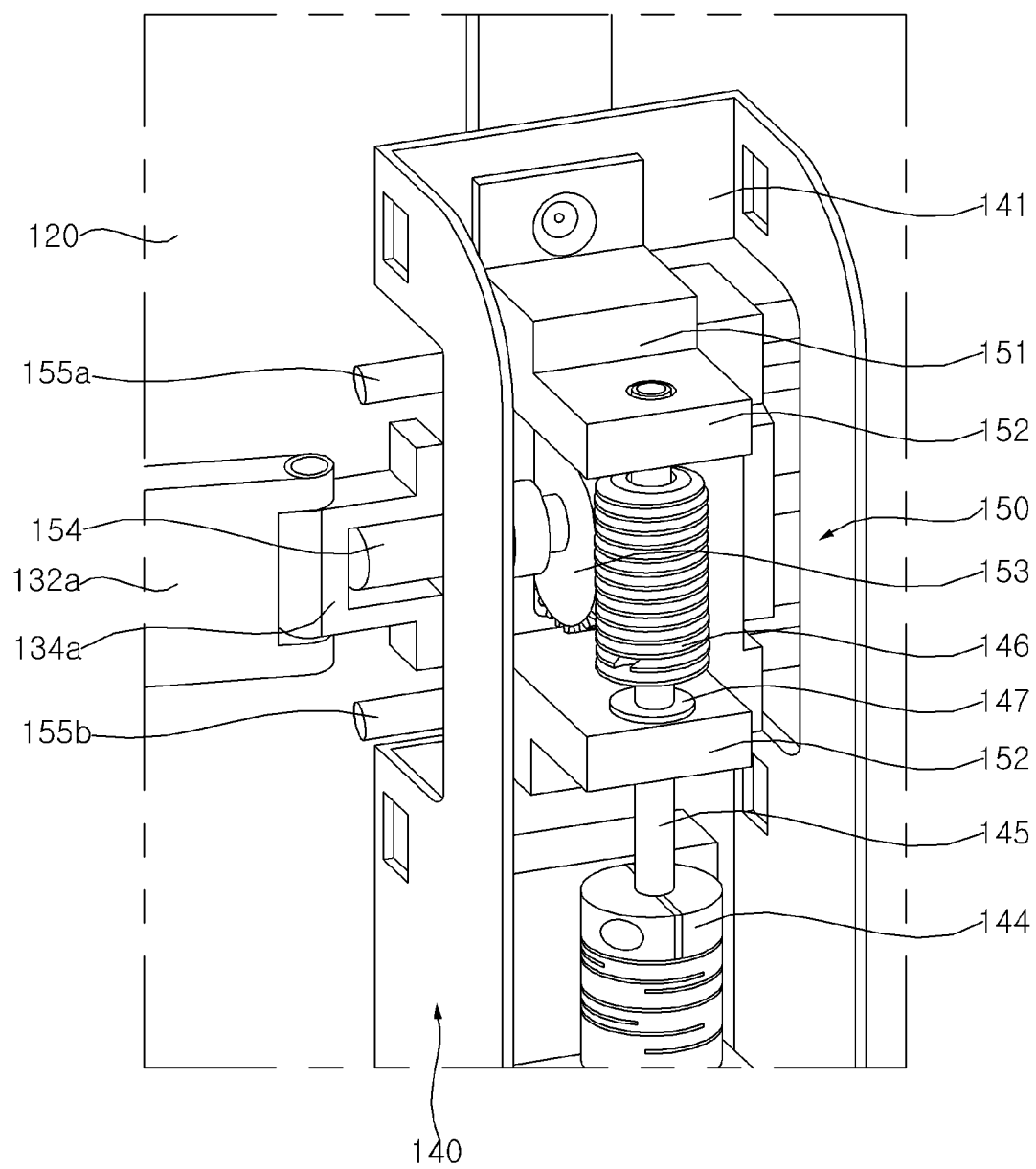
Figure 7:
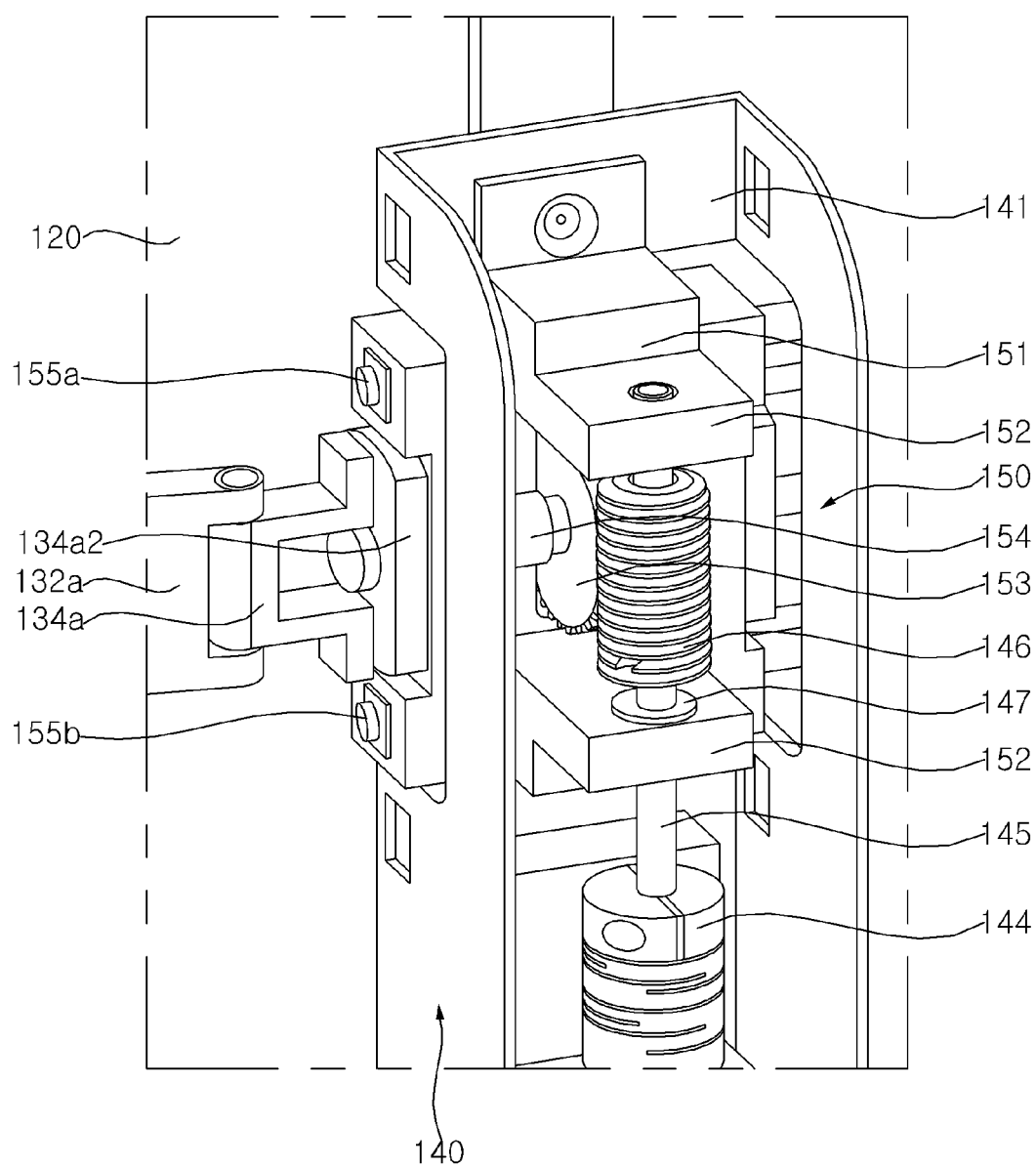
Figure 8:
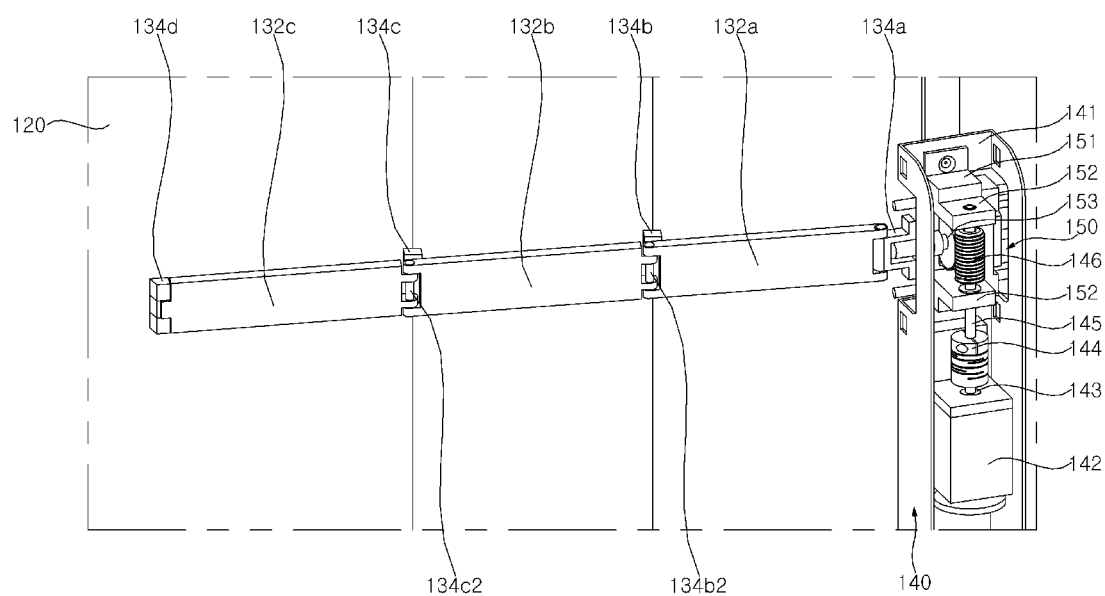
Figure 9:
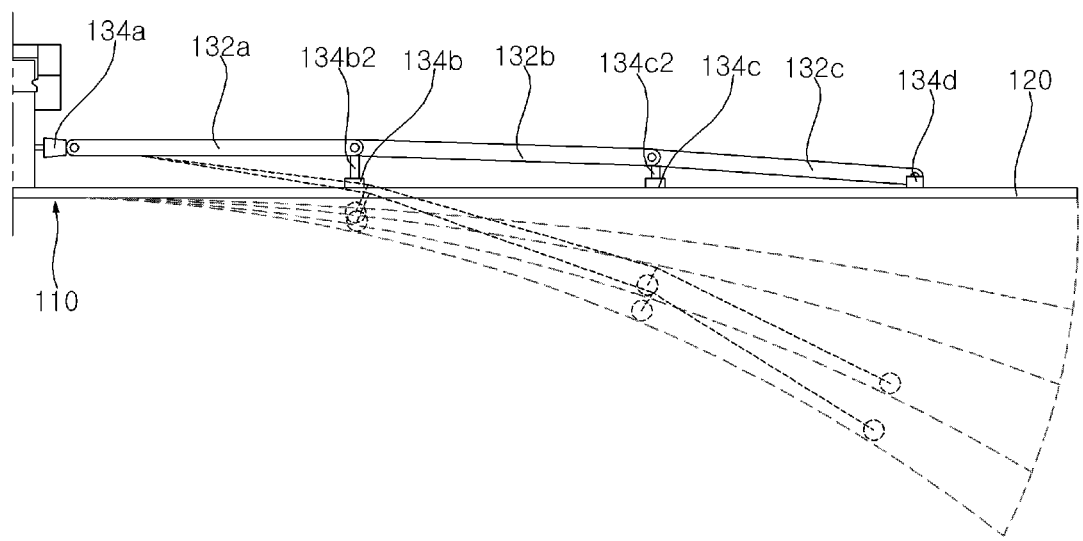
Figure 10:
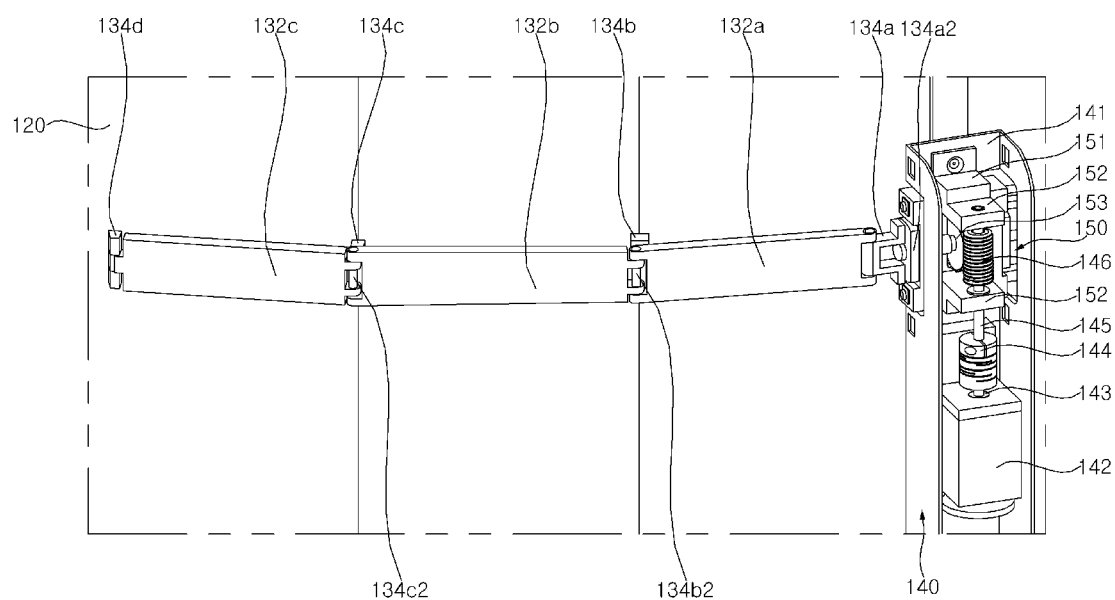
Figure 11:
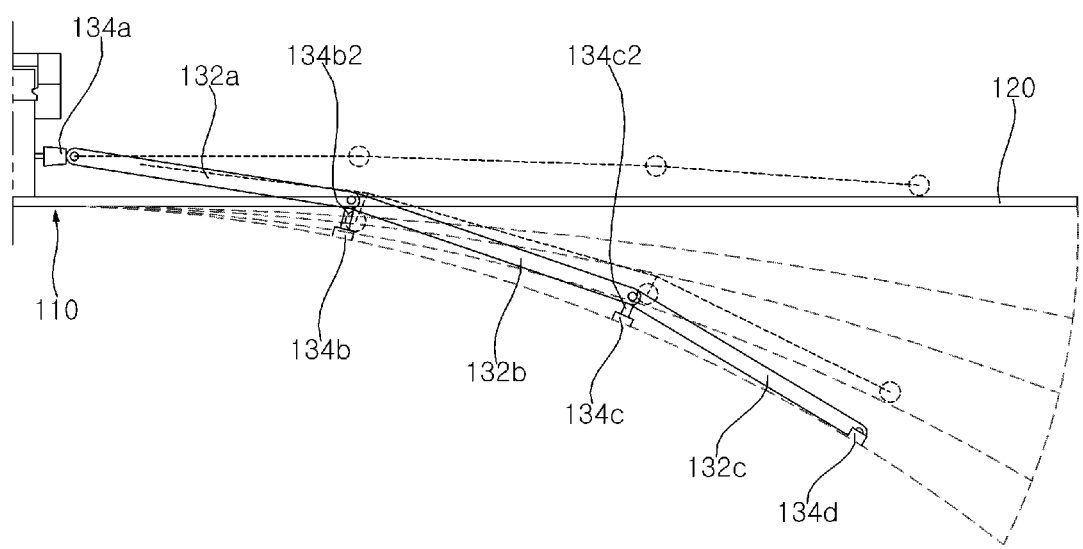

Referring to FIGS. 6 and 7, a mount bracket 141 may be mounted to the rear frame 131 (refer to FIG. 2). A motor 142 (refer to FIG. 8) may be mounted to the mount bracket 141. A driving shaft 143 (refer to FIG. 8) may be connected to the motor 142 to rotate. A joint 144 may connect a driving shaft 145 to extend the driving shaft 143.

A driving unit 140 may be mounted to the rear frame 120. The driving unit 140 may be referred to as an actuator 140. The driving unit 140 may include a motor 142 having a driving shaft 143, 145 and a gearbox 150 connected to the driving shaft 143, 145. The gear mount 151, 152 may be mounted to the mount bracket 141. The gear mount 151, 152 may be positioned adjacent to the distal end of the driving shaft 145. A worm gear 153 may be rotatably installed in a first part 151 of the gear mount 152, 153, and a worm 146 may be rotatably installed in a second part 152 of the gear mount 152, 153.

The worm gear 153 may be rotatably mounted to the gear mount 151, 152. The worm gear 153 may have a rotation shaft parallel to the length direction of the arm 132a. The driving shaft 145 may be inserted into the worm 146. The rotation shaft of the worm 146 may intersect the rotation shaft of the worm gear 153. For example, the rotation shaft of the worm 146 may be perpendicular to the rotation shaft of the worm gear 153.

A guide rail 155a, 155b may be inserted into the first part 151 of the gear mount 151, 152. The guide rail 155a, 155b may be plural, and the plurality of guide rails 155a and 155b may be fixed to the first part 151 in parallel at an interval wider than the width of the first arm 132a.

A slider 134a2 may move on the guide rail 155a, and 155b. A plurality of guide rails 155a and 155b may be inserted into both sides of the slider 134a2. A lead screw 154 may be fixed to the worm gear 153. The lead screw 154 may be a rotation shaft of the worm gear 153. The lead screw 154 may be inserted into the slider 134a2. The lead screw 154 may be inserted into the slider 134a2 through thread coupling. When the lead screw 154 rotates, the slider 134a2 may move in the shaft direction of the lead screw 154. The first connector 134a may be fixed to the slider 134a2.

Accordingly, the rotational force provided by the motor 142 allows the slider 134a2 to move on the shaft of lead screw 154 through the gear box 150, and the slider 134a2 may provide a reciprocating linear motion force to the first arm 132a.

Referring to FIGS. 8 to 11, the first connector 134a may be pivotally connected to one end of the slider 134a2 (refer to FIG. 7) and the first arm 132a, one end of the second connector 134b2 may be pivotally connected to the second supporter 134b, and the other end may be pivotally connected to the other end of the first arm 132a and one end of the second arm 132b. One end of the third connector 134c2 may be pivotally connected to the third supporter 134c, and the other end may be pivotally connected to the other end of the second arm 132b and one end of the third arm 132c.

The length of the third connector 134c2 may be smaller than the length of the second connector 134b2. The distance between the first arm 132a and the rear surface of the plate 120 may be greater than the distance between the second arm 132b and the plate 120. The distance between the second arm 132b and the rear surface of the plate 120 may be greater than the distance between the third arm 132c and the rear surface of the plate 120.

Accordingly, the arms 132a, 132b, and 132c may more effectively transmit the force of curving the plate 120 through the connectors 134b2 and 134c2.

Figure 12:
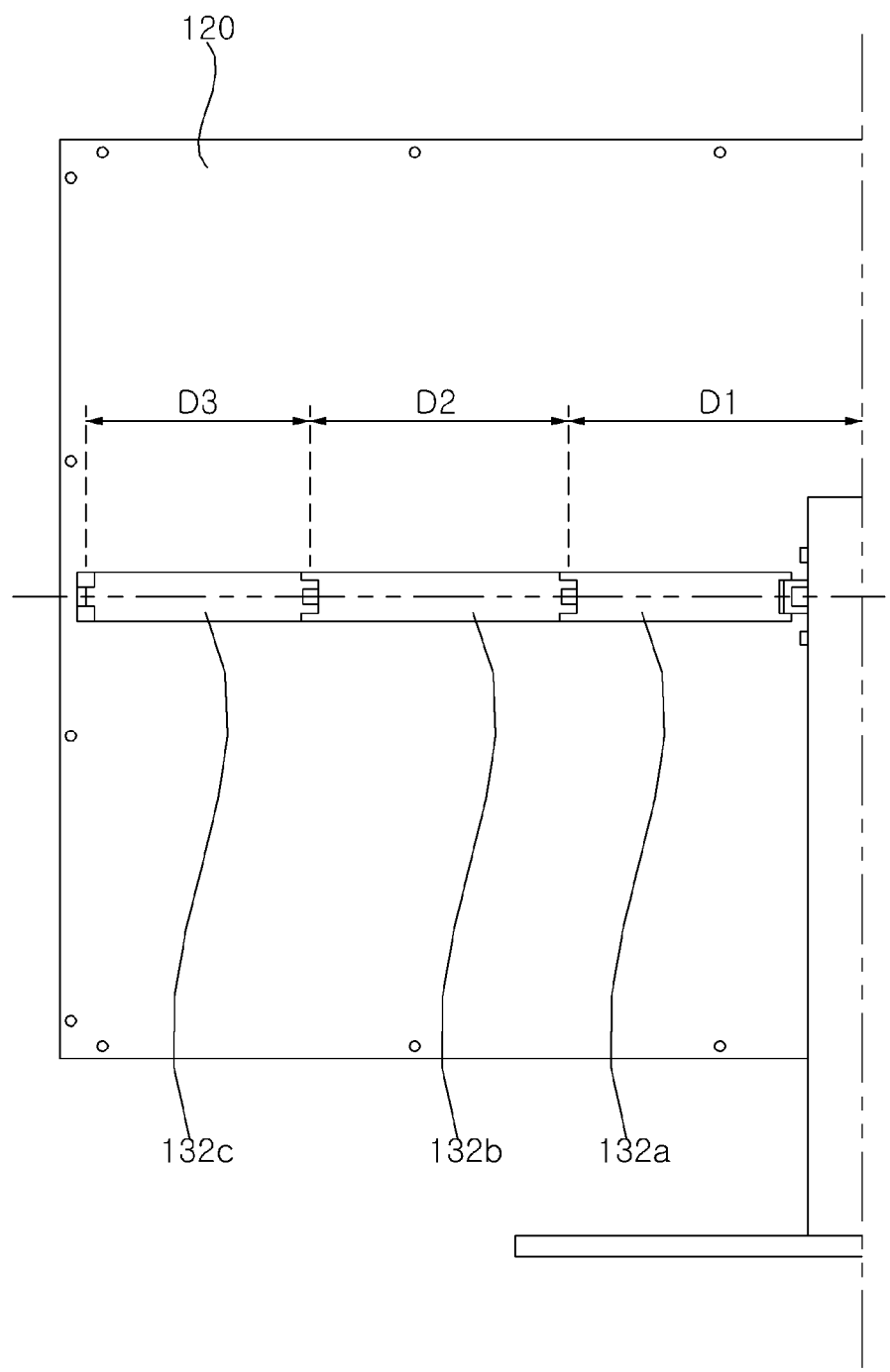
Figure 13:
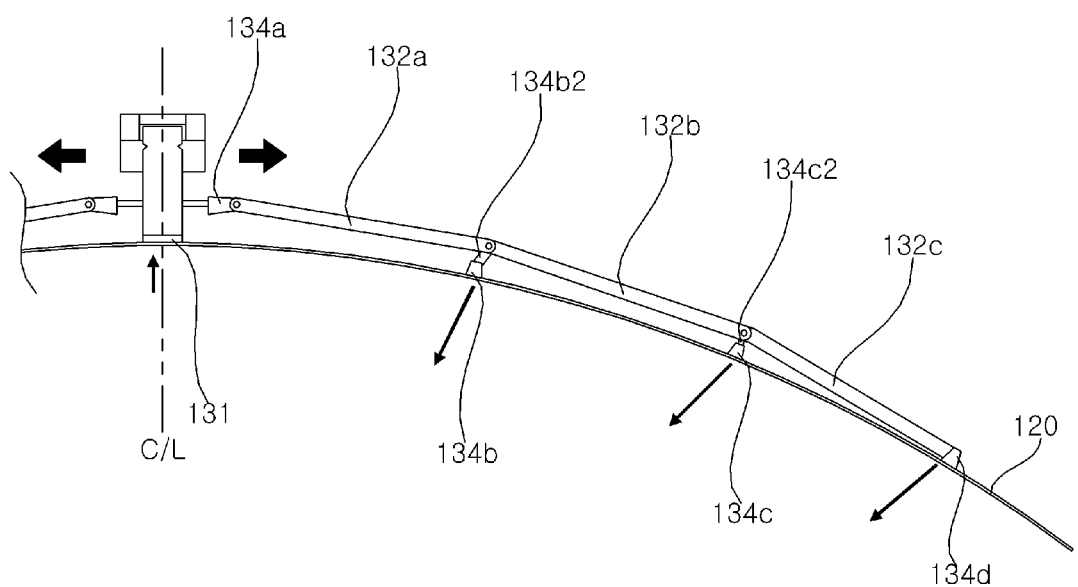

Referring to FIGS. 12 and 13, the length direction center of the first arm 132a, the second arm 132b, and/or the third arm 132c may be positioned in the center in the up-down direction of the plate 120. That is, the upper side of the plate 120 may be symmetrical with the lower side of the plate 120 with respect to the arms 132a, 132b, and 132c.

The length of the first arm 132a may be greater than the length of the second arm 132b, and the length of the second arm 132b may be greater than the length of the third arm 132c. The length of the arms 132a, 132b, and 132c may be gradually shortened from the rear frame 131 toward the side of the plate 120.

When it is closer to the side of the plate 120, it may be more difficult to transmit a force of curving the plate 120 through the arms 132a, 132b, and 132c. When the length of the arms 132a, 132b, and 132c is gradually shortened as it progresses from the rear frame 131 toward the side of the plate 120, the force of curving the plate 120 may be effectively transmitted to the plate 120.

Figure 14:
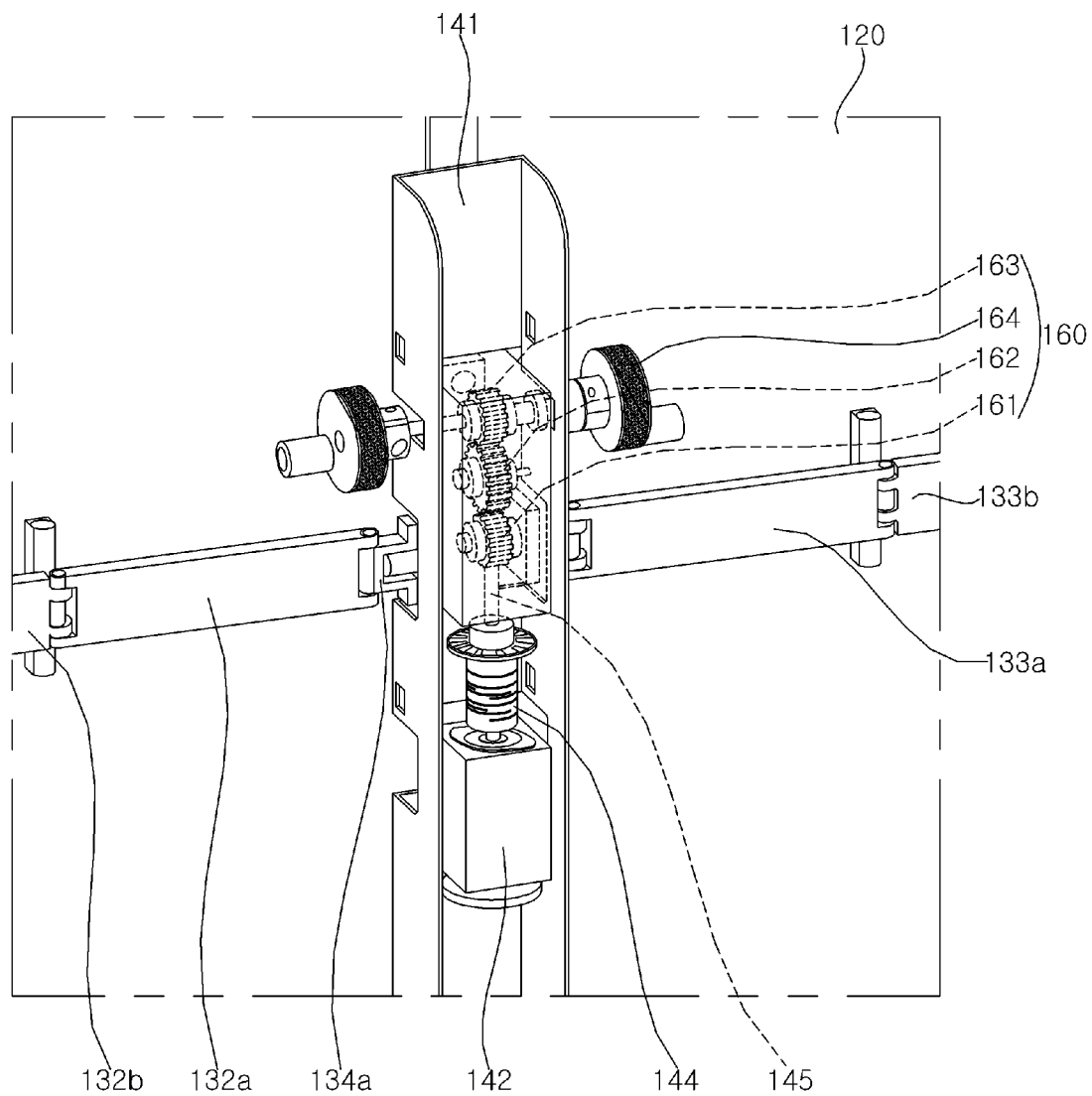

Referring to FIG. 14, a manual gearbox 160 may be mounted to the mount bracket 141. The manual gearbox 160 may include a hand gear 164 and a transmission gear 161, 162, 163. The transmission gear 161, 162, 163 may be plural. A plurality of transmission gears 161, 162, and 163 may include a first gear 163, a second gear 162, and a third gear 161. The first gear 163 may be rotatably installed in the manual gearbox 160. The first gear 163 may share a rotation shaft with the hand gear 164. When the hand gear 164 rotates, the first gear 163 may also rotate. The hand gear 164 and the first gear 163 may be fixed coaxially.

The second gear 162 may be rotatably installed in the manual gearbox 160. The second gear 162 may engage with the first gear 163. The third gear 161 may be rotatably installed in the manual gearbox 160. The third gear 161 may engage with the second gear 162. The third gear 163 may engage with the worm gear 153 (refer to FIG. 15). For example, the transmission gears 161, 162, and 163 may be a reduction gear.

When the hand gear 164 is rotated, a rotational force is transmitted through the transmission gears 161, 162, and 163 to rotate the worm gear 153. As the arms 132 and 133 move by the rotation of the worm gear 153, the plate 120 may be curved.

Figure 15:
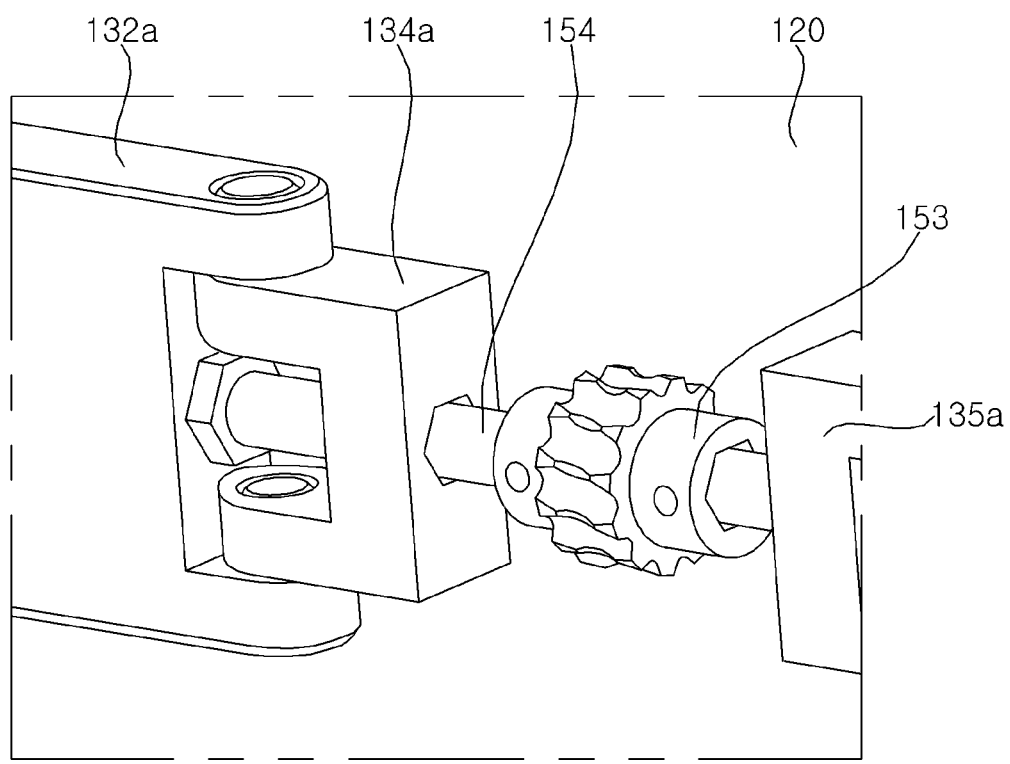
Figure 16:
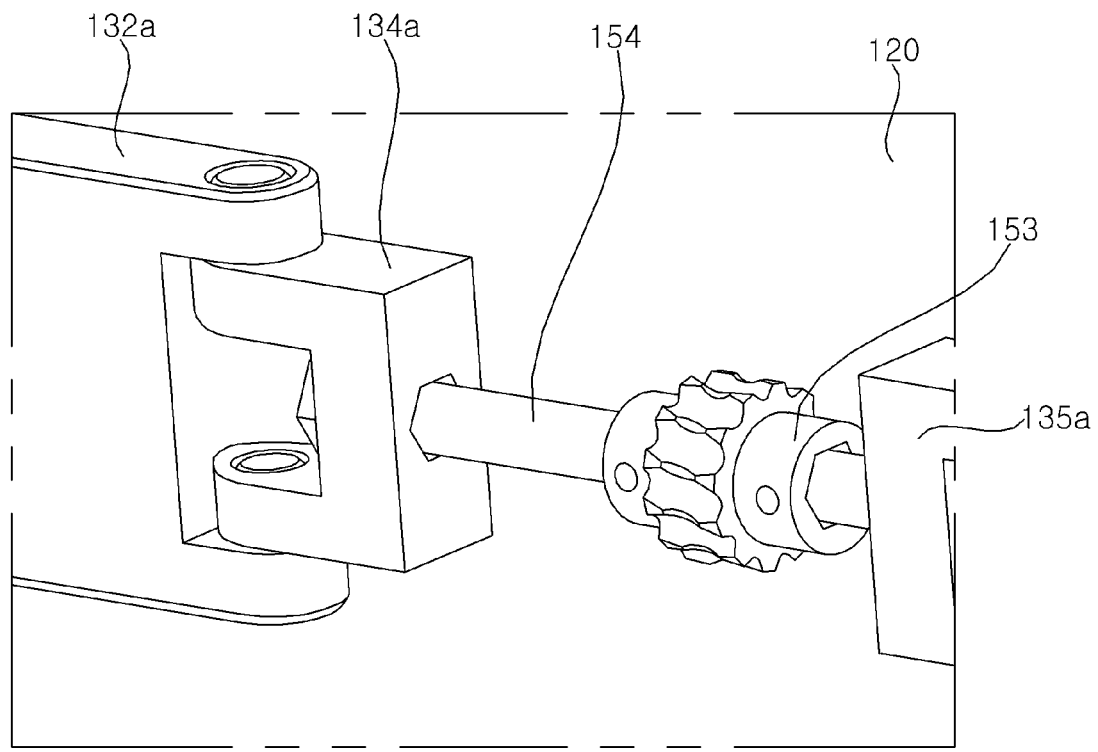
Figure 17:
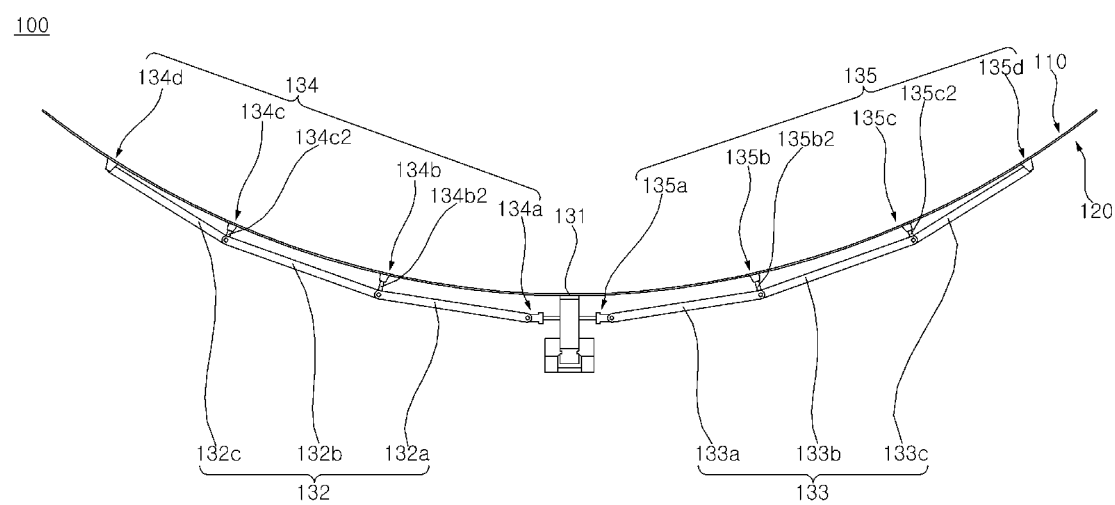

Referring to FIGS. 15 to 17, the lead screw 154 may be inserted into the worm gear 153, and the worm gear 153 may rotate together with the lead screw 154. The lead screw 154 may be inserted into the first connector 134a, 135a, and may be screwed tightly. When the lead screw 154 rotates, the first connector 134a, 135a may move in the lead screw 154.

When the lead screw 154 rotates, the connector 134a may move from the center of the plate 120 toward one side while pushing the arm 132a. When the lead screw 154 rotates, the connector 135a may move from the center of the plate 120 toward the other side while pushing the arm 133a. When the lead screw 154 rotates, the connector 134a and the connector 135a may move in a direction away from or closer to each other.

Accordingly, the plate 120 may be curved concavely in a forward direction.

Referring to FIGS. 1 to 17, a display device may include: a flexible display panel 110; a flexible plate 120 at a rear of the display panel 110, to which the display panel 110 is coupled, and has one side and the other side facing the one side; a rear frame 131 coupled to a rear of the plate 120; a driving unit 140 which is coupled to the rear frame 131, and provides a driving force for moving in a direction from the one side to the other side; and an arm 132, 133 which is elongated to have one end that is connected to the driving unit 140 and the other end that is coupled to a rear surface of the plate 120.

The arm 132, 133 may include a plurality of arms 132 and 133, and the plurality of arms 132 and 133 may be sequentially disposed in the above direction, and may be pivotally connected to each other.

The plurality of arms 132 and 133 may include: a first arm 132a, 133a having one end connected to the driving unit 140; a second arm 132b, 133b pivotally connected to the first arm 132a, 133a; and a third arm 132c, 133c pivotally connected to the second arm 132b, 133b.

The display device may further include: a first supporter 134b, 135b which is positioned between the first arm 132a, 133a and the second arm 132b, 133b, and fixed to the plate 120; a second supporter 134c, 135c which is positioned between the second arm 132b, 133b and the third arm 132c, 133c, and fixed to the plate 120; a first connector 134b2, 135b2 which has one end pivotally connected to the first supporter 134b, 135b, and the other end pivotally connected to the first arm 132a, 133a and the second arm 132b, 133b; and a second connector 134c2, 135c2 which has one end pivotally connected to the second supporter 134c, 135c, and the other end pivotally connected to the second arm 132b, 133b and the third arm 132c, 133c.

The driving unit 140 may include: a motor 142; a worm 146 which is fixed to a rotation shaft of the motor 142; a worm gear 153 which is rotatably mounted to the rear frame 131, and engaged with the worm 146; a lead screw 154 which rotates together with a rotation shaft of the worm gear 153; a slider 134a2 which is screwed to the lead screw 154; and a third connector 134a, 135a which is fixed to the slider 134a2, and pivotally connected to the first arm 132a, 133a.

The display device may further include a third supporter 134d, 135d which is positioned adjacent to a distal end of the third arm 132c, 133c, and fixed to the plate 120, wherein the distal end of the third arm 132c, 133c may be pivotally connected to the third supporter 134d, 135d.

A length of the first connector 134b2, 135b2 may be greater than a length of the second connector 134c2, 135c2.

A length of the first arm 132a, 133a may be greater than a length of the second arm 132b, 133b, and a length of the third arm 132c, 133c may be greater than the length of the second arm 132b, 133b.

The driving unit 140 may include: a hand gear 164 which is rotatably mounted to the rear frame 131; at least one reduction gear 161, 162, 163 which is rotatably mounted to the rear frame 131, and engaged with the hand gear 164; and a worm gear 153 which is rotatably mounted to the rear frame 131, and engaged with the at least one reduction gear 161, 162, 163.

The display device may further include: a lead screw 154 which rotates together with a rotation shaft of the worm gear 153; and a slider 134a, 135a which is screwed to the lead screw 154, and pivotally connected to the first arm 132a, 133a.

According to at least one embodiment of the present disclosure, it is possible to provide a frame structure which can freely change the curvature of a display panel.

According to at least one embodiment of the present disclosure, it is possible to provide a mechanism which can freely change the curvature of a display.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of the invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A display device comprising:
    a flexible display panel;
    a flexible plate coupled to a rear of the display panel, and having a first side and a second side opposite the first side;
    a rear frame coupled to a rear of the flexible plate;
    a driving unit which is coupled to the rear frame, and which provides a driving force for moving in a direction from the first side to the second side;
    an arm which is elongated, and having a first end that is connected to the driving unit and a second end that is coupled to a rear surface of the flexible plate,
    wherein the arm comprises a plurality of arms that are sequentially disposed in the above direction, and that are pivotally connected to each other,
    wherein the plurality of arms comprise: a first arm having a first end connected to the driving unit; a second arm pivotally connected to the first arm; and a third arm pivotally connected to the second arm;
    a first supporter which fixes the first arm to the flexible plate;
    a second supporter which fixes the second arm to the flexible plate;
    a first connector which has a first end pivotally connected to the first supporter, and a second end pivotally connected to the first arm and the second arm; and
    a second connector which has a first end pivotally connected to the second supporter, and a second end pivotally connected to the second arm and the third arm;
    wherein the driving unit is either a first driving unit or a second driving unit, wherein the first driving unit comprises:
  a motor;
  a worm which is fixed to a rotation shaft of the motor;
  a worm gear which is rotatably mounted to the rear frame, and which is engaged with the worm;
  a lead screw which rotates together with a rotation shaft of the worm gear;
  a slider which is screwed to the lead screw; and
  a third connector which is fixed to the slider, and which is pivotally connected to the first arm,
wherein the second driving unit comprises:
wherein the driving unit comprises:
  a hand gear which is rotatably mounted to the rear frame;
  at least one reduction gear which is rotatably mounted to the rear frame, and which is engaged with the hand gear; and
  a worm gear which is rotatably mounted to the rear frame, and which is engaged with the at least one reduction gear.

2. The display device of claim 1, further comprising a third supporter which is positioned adjacent to a distal end of the third arm, and which is fixed to the flexible plate,
  wherein the distal end of the third arm is pivotally connected to the third supporter.

3. The display device of claim 1, wherein a length of the first connector is greater than a length of the second connector.

4. The display device of claim 1, wherein a length of the first arm is greater than a length of the second arm,
  wherein a length of the third arm is greater than the length of the second arm.

5. The display device of claim 1, wherein, based on the driving unit being the second driving unit, the display device further comprises:
  a lead screw which rotates together with a rotation shaft of the worm gear; and
  a slider which is screwed to the lead screw, and which is pivotally connected to the first arm.

* * * * *